US008805981B2

(12) United States Patent
Willoughby et al.

(10) Patent No.: US 8,805,981 B2
(45) Date of Patent: Aug. 12, 2014

(54) COMPUTING SYSTEM FABRIC AND ROUTING CONFIGURATION AND DESCRIPTION

(75) Inventors: Brian D. Willoughby, Georgetown, TX (US); Michael V. Mattress, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 2415 days.

(21) Appl. No.: 10/396,667

(22) Filed: Mar. 25, 2003

(65) Prior Publication Data
US 2004/0193706 A1 Sep. 30, 2004

(51) Int. Cl.
*G06F 15/173* (2006.01)
*H04L 29/08* (2006.01)
*H04L 29/06* (2006.01)

(52) U.S. Cl.
CPC ........... *H04L 29/08072* (2013.01); *H04L 29/06* (2013.01)
USPC ............... 709/223; 709/238; 709/239; 713/1; 713/2

(58) Field of Classification Search
USPC ........................ 709/238–239, 223; 713/1–2
See application file for complete search history.

(56) References Cited

U.S. PATENT DOCUMENTS

| | | | |
|---|---|---|---|
| 5,020,059 A | | 5/1991 | Gorin et al. |
| 5,319,751 A | | 6/1994 | Garney |
| 5,386,466 A | * | 1/1995 | Bales et al. ............... 379/221.06 |
| 5,506,847 A | * | 4/1996 | Shobatake .................... 370/338 |
| 5,583,987 A | | 12/1996 | Kobayashi et al. |
| 5,671,413 A | * | 9/1997 | Shipman et al. .................. 713/2 |
| 5,748,980 A | * | 5/1998 | Lipe et al. .......................... 710/8 |
| 5,859,975 A | | 1/1999 | Brewer et al. |
| 5,884,027 A | * | 3/1999 | Garbus et al. ................. 709/250 |
| 5,913,045 A | * | 6/1999 | Gillespie et al. ............. 710/311 |
| 5,938,765 A | * | 8/1999 | Dove et al. ........................ 713/1 |
| 5,970,496 A | * | 10/1999 | Katzenberger ........................ 1/1 |
| 5,987,521 A | * | 11/1999 | Arrowood et al. ............ 709/239 |
| 6,023,733 A | * | 2/2000 | Periasamy et al. ............ 709/241 |
| 6,049,524 A | * | 4/2000 | Fukushima et al. .......... 370/220 |
| 6,072,774 A | * | 6/2000 | Natarajan et al. ............. 370/231 |

(Continued)

FOREIGN PATENT DOCUMENTS

| | | |
|---|---|---|
| EP | 1182545 A2 | 2/2002 |
| JP | 08-016534 | 1/1996 |

(Continued)

OTHER PUBLICATIONS

"HyperTransport™ Technology I/O Link," Advanced Micro Devices, Inc., Jul. 20, 2001, pp. 1-25.

(Continued)

*Primary Examiner* — Saket K Daftuar
(74) *Attorney, Agent, or Firm* — Abel Law Group, LLP

(57) ABSTRACT

A technique for configuring a computing system that allows for multiple computing systems and device populations to be supported by a single BIOS implementation is presented. In one embodiment, the technique includes processing topology map parameters that describe physical connections of a computing system, wherein the computing system includes a plurality of processing nodes; determining routing paths for traffic between the plurality of processing nodes; and determining a population of the plurality of processing nodes. In one embodiment, the determining the routing paths is performed during BIOS build time. In another embodiment, the determining the routing paths is performed during BIOS run time.

45 Claims, 8 Drawing Sheets

(56) References Cited

U.S. PATENT DOCUMENTS

| | | | |
|---|---|---|---|
| 6,108,739 A | 8/2000 | James et al. | |
| 6,158,000 A | 12/2000 | Collins | |
| 6,167,492 A | 12/2000 | Keller et al. | |
| 6,195,749 B1 * | 2/2001 | Gulick | 713/1 |
| 6,211,891 B1 | 4/2001 | Wahlig | |
| 6,269,459 B1 | 7/2001 | Wahlig | |
| 6,327,669 B1 | 12/2001 | Croslin | |
| 6,370,633 B2 | 4/2002 | Sethi | |
| 6,233,641 B1 | 8/2002 | Owen et al. | |
| 6,434,656 B1 | 8/2002 | Downer et al. | |
| 6,462,745 B1 | 10/2002 | Behrbaum et al. | |
| 6,496,510 B1 * | 12/2002 | Tsukakoshi et al. | 370/401 |
| 6,560,720 B1 | 5/2003 | Chirashnya et al. | |
| 6,633,964 B2 * | 10/2003 | Zimmer et al. | 711/163 |
| 6,701,341 B1 | 3/2004 | Wu et al. | |
| 6,701,421 B1 | 3/2004 | Elnozahy et al. | |
| 6,741,561 B1 * | 5/2004 | Lee | 370/230 |
| 6,760,838 B2 | 7/2004 | Owen et al. | |
| 6,791,939 B1 | 9/2004 | Steele et al. | |
| 6,826,148 B1 * | 11/2004 | Lee | 370/230 |
| 6,865,157 B1 | 3/2005 | Scott et al. | |
| 6,883,108 B2 * | 4/2005 | Lee et al. | 714/4 |
| 6,918,103 B2 * | 7/2005 | Brawn et al. | 716/18 |
| 6,988,149 B2 * | 1/2006 | Odenwald | 709/250 |
| 6,996,629 B1 * | 2/2006 | Odenwald | 709/238 |
| 7,007,189 B2 * | 2/2006 | Lee et al. | 714/4 |
| 7,027,413 B2 * | 4/2006 | Lee et al. | 370/255 |
| 7,028,099 B2 | 4/2006 | Troxel et al. | |
| 7,051,334 B1 | 5/2006 | Porter et al. | |
| 7,072,976 B2 * | 7/2006 | Lee | 709/238 |
| 2002/0087652 A1 | 7/2002 | Davis et al. | |
| 2002/0103995 A1 | 8/2002 | Owen et al. | |
| 2002/0141343 A1 | 10/2002 | Bays | |
| 2003/0055529 A1 | 3/2003 | Aosawa | |
| 2003/0225909 A1 | 12/2003 | Glasco et al. | |
| 2004/0122973 A1 | 6/2004 | Keck et al. | |
| 2004/0139287 A1 | 7/2004 | Foster et al. | |
| 2004/0205304 A1 | 10/2004 | McKenney et al. | |

FOREIGN PATENT DOCUMENTS

| | | |
|---|---|---|
| JP | 08-030533 | 2/1996 |
| TW | 508532 B | 11/2002 |
| WO | WO8903564 | 4/1989 |
| WO | WO9412939 | 6/1994 |
| WO | 03017126 A1 | 2/2003 |

OTHER PUBLICATIONS

"HyperTransport™ I/O Link Specification," HyperTransport Technology Consortium, Revision 1.03, Oct. 10, 2001, pp. 1-217.

"HyperTransport™ Technology: Simplifying System Design," Advanced Micro Devices, Inc., Oct. 2002, pp. 1-22.

U.S. Appl. No. 10/459,344, filed Jun. 11, 2003, entitled "Faster Memory Access in Non-Unified Memory Access Systems," and naming as inventor(s) Elsie D. Wahlig, Marlin L. McGuire, and Paul Devriendt.

Search Report for Taiwan Patent Application No. 093103718, corresponding to U.S. Appl. No. 10/396,667 (2 pages), mailed Nov. 6, 2007.

Busch, M.T. et al., "Dynamic K-Shortest Path (DKSP) Facility Restoration Algorithm," Global Telecommunications Conference, GLOBECOM'94, Communications: The Global Bridge, IEEE, San Francisco, CA, Nov. 28, 1994, pp. 536-542, vol. 1.

"HyperTransport I/O Link Specification Revision 1.03," HyperTransport Technology Consortium, Oct. 10, 2001, pp. 33-36 and 67-68.

* cited by examiner

```
START_HYPERTRAN_DEFS
    ;          FabricType
  START_cHT_FABRIC_MAP  <SLEDGEHAMMER>
    ;          muxData
    cHT_NODE  00h
    cHT_NODE  01h
    cHT_NODE  02h
    cHT_NODE  03h
    ;
    ;          srcNode, srcPort,   destNode, destPort,   speed, width
    cHT_LINK   0,       1,         1,        2,          HT200MHZ, HT8BITS
    cHT_LINK   0,       0,         2,        0,          HT200MHZ, HT8BITS
    cHT_LINK   1,       0,         3,        0,          HT200MHZ, HT8BITS
    cHT_LINK   2,       2,         3,        1,          HT200MHZ, HT8BITS
  END_cHT_FABRIC_MAP ;              srcNode, srcPort, minBus, maxBus
  START_ncHT_CHAIN 00h,     2,       00h,    03Fh                     ;Host0 chain
    ;         srcDev, srcPort, destDev:, destPort, speed,    width
    ncHT_LINK 18h,    2,       06h,      0,        HT200MHZ, HT8BITS
    ;         device name,  PCI DevNum
    ncHT_DEVICE       amd8111,  06h                                   ;Thor
  END_ncHT_CHAIN ;              srcNode, srcPort, minBus, maxBus
  START_ncHT_CHAIN 01h,     1,       40h,    07Fh                     ;Host1 chain
    ;         srcDev, srcPort, destDev:, destPort, speed,    width
    ncHT_LINK 19h,    1,       01h,      0,        HT200MHZ, HT16BITS
    ;         device name,  PCI DevNum
    ncHT_DEVICE       amd8131A, 01h                                   ;Golem A
    ;         srcDev, srcPort, destDev:, destPort, speed,    width
    ncHT_LINK 01h,    1,       03h,      0,        HT200MHZ, HT16BITS
    ;         device name,  PCI DevNum
    ncHT_DEVICE       amd8131B, 03h                                   ;Golem B
  END_ncHT_CHAIN

END_HYPERTRAN_DEFS
```

FIG. 6

COMPUTING SYSTEM FABRIC AND ROUTING CONFIGURATION AND DESCRIPTION

BACKGROUND

1. Field of the Invention

This invention relates to system initialization and more particularly to describing and configuring computing system fabric and routing.

2. Description of the Related Art

Computing systems are information handling systems which are designed to give independent computing power to one or more users. Computing systems can be found in many forms including, for example, mainframes, minicomputers, workstations, servers, personal computers, internet terminals, notebooks and embedded systems. Personal computer (PC) systems include desk top, floor standing, or portable versions. A typical PC system is a microcomputer that includes a microprocessor, associated memory and control logic (typically on a system board) and a number of peripheral devices that provide input and/or output (I/O) for the system. PC system boards often receive expansion PCBs to increase the capabilities of the computer system and to connect to peripheral devices through an expansion bus. For example, various multimedia devices are commonly implemented as add-in cards in desktop and portable computers or as integrated circuits for installation on a system board.

Computing systems typically include a set of built-in software routines called the basic input/output system (BIOS). The BIOS is a software interface between the system hardware and the operating system software. The BIOS facilitates programmer and user interaction with the system hardware. Because the BIOS has qualities of software and hardware, it is often referred to as firmware. The BIOS is a set of instructions to the computer's microprocessor. The BIOS is commonly coded using, for example, assembly language, and stored onto a non-volatile memory such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS.

The BIOS controls several important functions of personal computer systems. For instance, the BIOS performs various functions at power up, including testing and initializing memory, inventorying and initializing the system, and testing the system. These functions at power up are referred to as "system boot" or "booting the system" and can occur every time the system powers up or is reset. The BIOS also controls keystroke interpretation, display of characters, and communication via the PC ports. The operating system and application programs of a computer system access the BIOS rather than directly manipulating I/O ports, registers and control words of the specific system hardware. BIOS can be accessed through an interface of software interrupts and contains a plurality of entry points respectively corresponding to the different interrupts.

The BIOS code written by BIOS programmer(s) is compiled prior to storage in non-volatile memory on a computer system during what is referred to as BIOS build time. BIOS build time produces an executable program that is capable of booting the computer system. Therefore, BIOS is often specifically tailored to the architecture of the computer system. When BIOS is executed, referred to as BIOS run time, BIOS performs the necessary system configurations such as initializing any hardware, communication links, and the like.

FIGS. 1A-1B illustrate exemplary prior art computing system architectures. FIG. 1A illustrates an exemplary prior art single processor computing system architecture 100. BIOS executes on processor 102, referred to as the boot strap processor, to boot the computing system. Processor 102 can be any type of processor with any architecture, for example, a single scalar, a superscalar or a VLIW processor. As illustrated, processor 102 communicates through north bridge 104 to memory array 106. North bridge 104 includes a memory controller and one or more bridges to other devices. North bridge 104 communicates with one or more south bridges 108 on a standard bus 109, for example, a peripheral component interconnect (PCI) bus. South bridge 108 communicates to one or more input/output (I/O) devices 110 on another standard bus 111, for example, an ISA bus. Additional devices (not shown) can be attached to standard buses 109 and 111.

FIG. 1B illustrates an exemplary prior art multiprocessor computing system architecture 150. Architecture 150 is similar to architecture 100, except that multiple processors 152 communicate through a north bridge 154. Multiple processors 152 can share a common bus (not shown) to north bridge 154 or have individual communication paths as shown. Multiple processors 152 access memory array 106 through a memory controller in north bridge 154. One of the processors 152 is designated as the boot strap processor and executes the BIOS to boot the computing system. During the boot process, the other processors 152 are inactive, for example, under a halt condition.

BIOS configuration of prior art system architectures such as architectures 100 and 150 include testing and initializing memory, inventorying and initializing the system, and testing the system. Such architectures have predefined communication paths between the processor(s), memory, bridges, peripheral devices, and system busses. BIOS is tailored to each system architecture during BIOS build time and thus simply writes configuration information as needed to any configuration registers during BIOS run time. BIOS for system architecture 100 typically must be re-written or modified for system architecture 150. Thus many different BIOS programs must be written and maintained, one for each different architecture, system board, and population option. However, here, BIOS is used to initialize hardware components on the motherboard and requires minimal development resource because of the low complexity of the hardware. Platform and silicon requirements are communicated to the BIOS developers. The BIOS developers customize the BIOS for the silicon and motherboard.

As technology evolves and the hardware complexity increases, providing a different BIOS for each different platform implementation is undesirable. The BIOS implementation of different platform implementations takes significant development time and resources and increases the risk of error. In addition, computing system platforms now include multiple devices that are fully programmable and need to be fully configured by BIOS. For example, a device can include multiple interface ports which can be physically connected to multiple devices in a variety of ways. BIOS must configure the devices to communicate to its neighbors, as well as determining routing patterns for efficient traffic flow. BIOS needs to become more intelligent to handle the complexity of today's computing systems while remaining flexible such that a single BIOS can support multiple computing system platform implementations.

SUMMARY

According to the present invention, a software module handles the complexity of today's computing systems while remaining flexible such that a single BIOS implementation can support multiple computing systems and device populations. The software module can determine a computing system's architecture, investigate the computing system to determine device population, and configure system devices accordingly, removing the necessity for a different BIOS for each computing system platform implementation. Additionally, the software module determines optimum routing for computing system traffic, providing even more flexibility in the population of platforms. Utilizing system topology map parameters that detail the physical structure of the platform, the software module programs device configuration registers to enable devices to efficiently communicate with each other. In one exemplary implementation, computing system configuration and routing paths are fully determined at BIOS build time, reducing the total code size and boot time needed to initialize the computing system fabric. In another exemplary implementation, configuration and routing paths are determined at run time according to which processing nodes are presently active in the fabric, allowing great flexibility in processing node population.

Accordingly, in one embodiment, a technique for configuring a computing system that allows for multiple computing systems and device populations to be supported by a single BIOS implementation is presented. In one embodiment, the technique includes processing topology map parameters that describe physical connections of a computing system, wherein the computing system includes a plurality of processing nodes; determining routing paths for traffic between the plurality of processing nodes; and determining a population of the plurality of processing nodes.

In another embodiment, the determining the routing paths is performed during BIOS build time.

In another embodiment, the technique includes loading the routing paths into a node table in each of the plurality of processing nodes.

In another embodiment, the loading is terminated upon encountering a first unpopulated processing node.

In another embodiment, the technique includes after determining the population modifying the node table in each of the plurality of processing nodes wherever the node table references an unpopulated node.

In another embodiment, the determining the routing paths is performed during BIOS run time.

In another embodiment, the determining the routing paths comprises loading the routing paths into a node table of each processing node as the routing paths are determined.

In another embodiment, the determining the routing paths comprises determining the routing of request, response, and broadcast packets between the plurality of processing nodes.

In another embodiment, the determining the routing paths comprises performing a distance algorithm to find a shortest routing path.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 6 illustrates an exemplary format for topology map parameters according to an embodiment of the present invention.

The use of the same reference symbols in different drawings indicates similar or identical items.

DESCRIPTION OF THE PREFERRED EMBODIMENT(S)

Figure 1A:
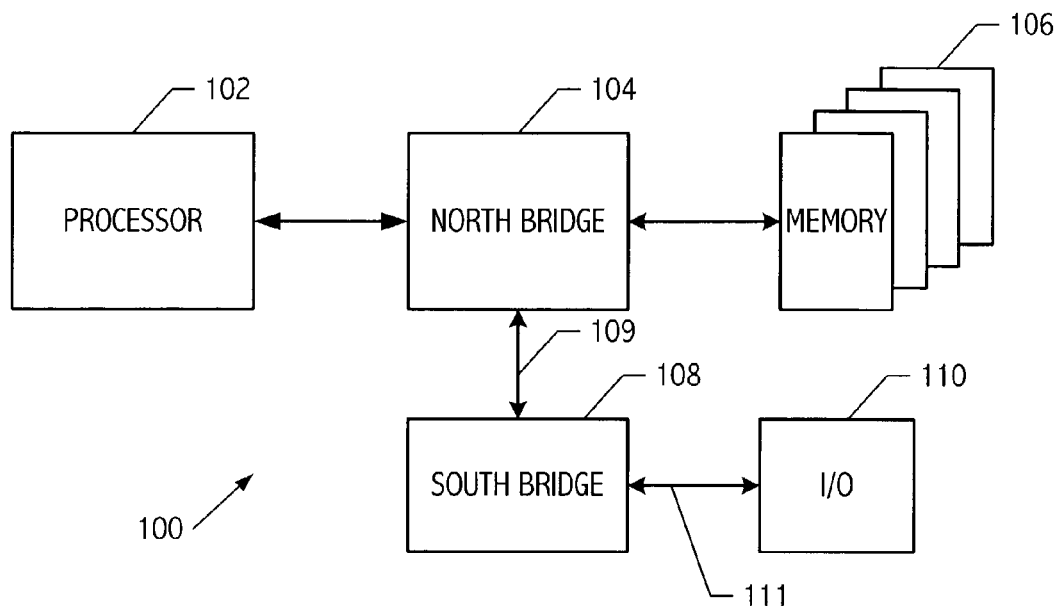
FIGS. 1A-1B illustrate exemplary prior art computing system architectures.
Figure 1B:
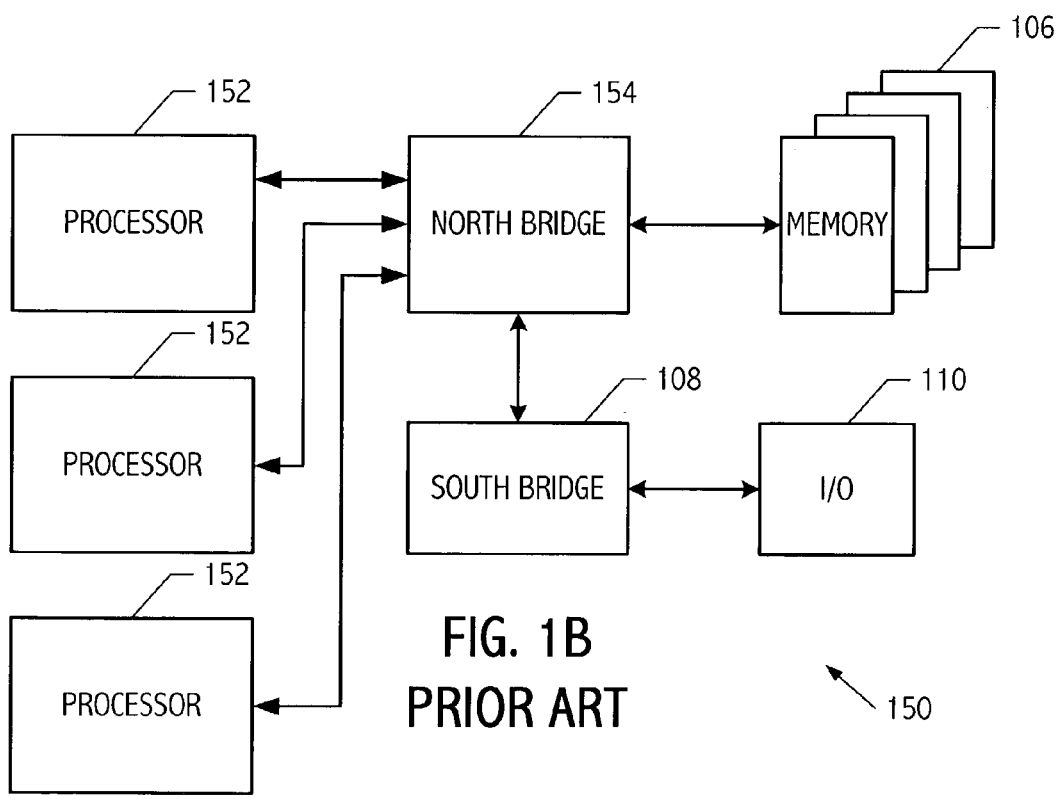
Figure 2:
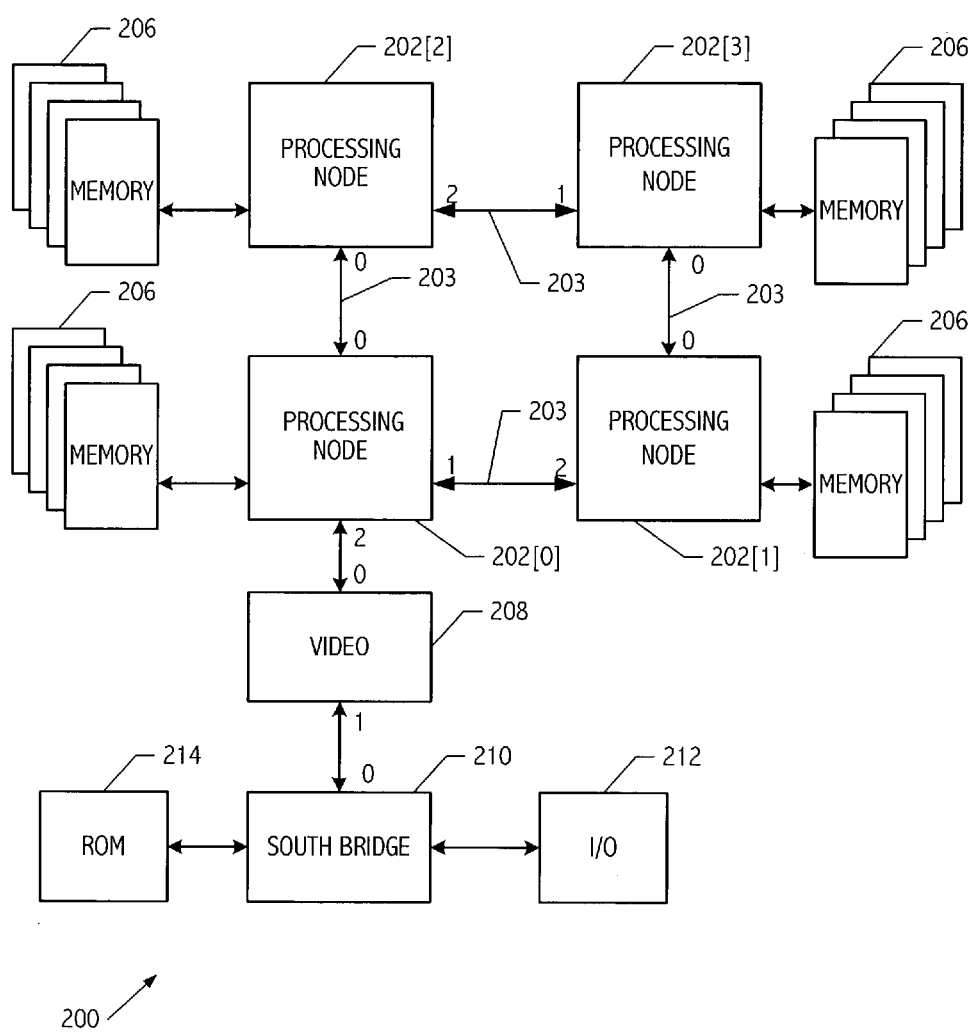
FIG. 2 illustrates an exemplary computing system architecture utilized by an embodiment of the present invention.

FIG. 2 illustrates an exemplary system 200 according to the present invention. System 200 is a multiprocessor system with multiple processing nodes 202[0:3] that communicate with each other via links 203. Processing node 202[0] is typically designated as the boot strap processor because processing node 202[0] has the most direct access to ROM 214 which stores BIOS code. The boot strap processor executes the BIOS code upon system initialization. Each of processing nodes 202 typically includes a processor, a memory controller, and link interface circuitry. Links 203 can be dual point to point links according to, for example, a split-transaction bus protocol such as the HyperTransport™ (HT) protocol. Links 203 can include a downstream data flow and an upstream data flow. Link signals typically include link traffic such as clock, control, command, address and data information and link sideband signals that qualify and synchronize the traffic flowing between devices. Each memory controller of processing nodes 202 communicates to a memory array 206. Processing nodes 202 and memory arrays 206 are in a "coherent" portion of the system, where all memory transactions are coherent.

A video device 208 can be coupled to one of the processing nodes 202 via another HT link. Video device 208 can be coupled to a south bridge 210 via another HT link. One or more I/O devices 212 can be coupled to south bridge 210. Video device 208, south bridge 210 and I/O devices 212 are in a "non-coherent" portion of the system. ROM 214 coupled to south bridge 210 contains BIOS code.

System 200 can be more complex than shown, for example, additional processing nodes 202 can make up the coherent portion of the system. Processing nodes 202 can have any number of HT links. Additionally, although processing nodes 202 are illustrated in a "ladder architecture," processing nodes 202 can be interconnected in a variety of ways and can have more complex couplings. For example, processing node 202[2] can be directly connected to processing node 202[1] via an additional HT link.

Each of processing nodes 202 includes multiple HT links for communicating to other devices. For example, processing unit 202[0] utilizes HT link 2 to communicate to video device 208, HT link 0 to communicate to processing node 202[2] and HT link 1 to communicate to processing node 202[1].

System initialization and configuration of multiprocessing system 200 by BIOS is very complex. Each processing node 202 must be configured in order to communicate with each other processing node 202. For example, when sending or receiving a request, response, or a broadcast message, processing node 202[1] must know which path, i.e., one of the HT links or to self, to send the information in order to reach the correct processing node(s). Each of processing nodes 202 is programmed with routing information for sending or receiving traffic to or from a particular node, which of processing nodes 202 has access to a particular memory address, and the like.

Additionally, BIOS configuration of a computing system is complex because system topology can be different for different platforms where processing nodes can be interconnected differently and for different versions of the same platform where processing nodes can be populated differently. For example, a system manufacturer can populate system 200 with only processing nodes 202[0] and 202[1]. In order to produce an alternate version of the platform, for example, where all processing nodes 202[0:3] are populated, the system manufacturer must produce and maintain a different BIOS and produce two different platforms or, preferably supply a single BIOS implementation that can support both platform versions. Further, preferably the single BIOS implementation can support multiple platform implementations.

Figure 3:
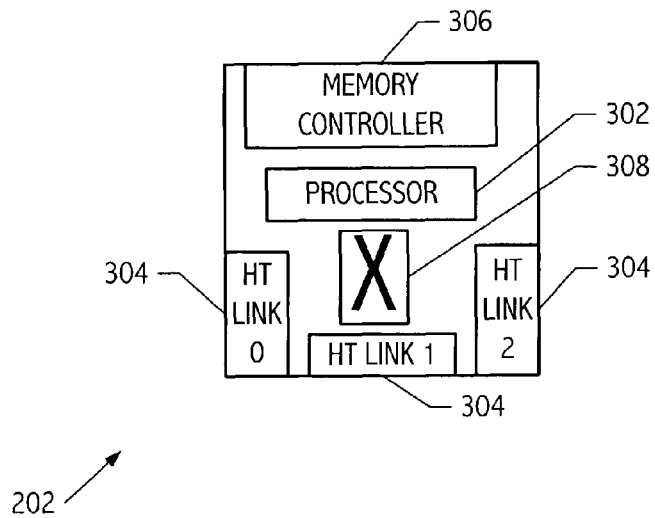
FIG. 3 illustrates an exemplary processing node according to an embodiment of the present invention.
Figure 4A:
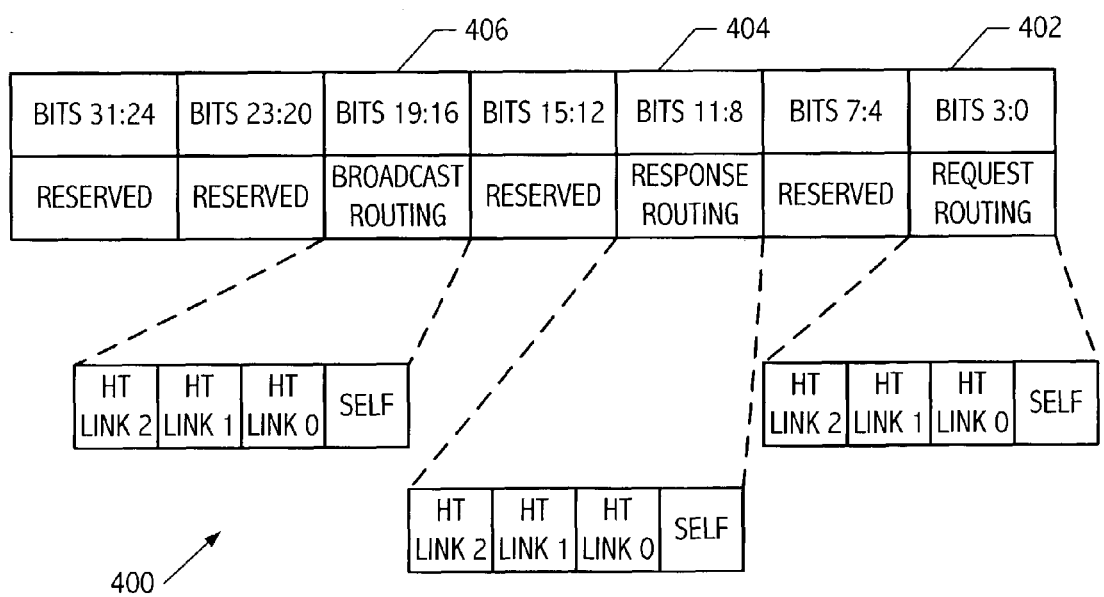
FIGS. 4A-4D illustrate the use of an exemplary node register according to embodiments of the present invention.

FIG. 3 illustrates an exemplary processing node 202 according to an embodiment of the present invention. As illustrated, processing node 202 includes a processor 302, multiple HT link interfaces 304, and a memory controller 306. A crossbar 308 transfers requests, responses and broadcast messages to processor 302 and/or the appropriate HT link interface(s) 304. Transfer of the requests, responses and broadcast messages is directed by multiple node registers that compose a node table located in each processing node 202. An exemplary node register is illustrated in FIG. 4A. Other configuration registers (not shown) on processing nodes 202 describe how to reach particular memory addresses (i.e., which processing node has memory access to this location).

For example, if processing node 202[0] wants to perform a memory access, a transaction is sent from processing node 202[0]'s processor to the cross bar circuitry. The cross bar circuitry of processing node 202[0] uses, for example, configuration registers that identify which address ranges belong to which processing node 202. The cross bar circuitry of processing node 202[0] identifies, for example, processing node 202[3] and uses node register 3 in the node routing table to determine which path is to be used to access processing node 202[3]. All configuration registers including node registers must be programmed by BIOS for proper communication amongst processing nodes 202.

FIG. 4A illustrates an exemplary node register 400 according to an embodiment of the present invention. Processing node 202 contains multiple node registers 400 in a node table, one node register for each possible processing node 202 in the system. Each node register table 400 includes three entries, request routing information 402, response routing information 404 and broadcast routing information 406. For a processing node with three HT links, each of routing informations 402, 404 and 406 has four bits, one for each HT link and one for a path to self. For a platform with an eight processing node capability, each processing node has eight node registers 404. Table entries can be accessed and over-written, and are not persistent. Upon power up and at reset, each of routing informations 402, 404, and 406 are initialized to the value 01h, indicating that packets should be accepted by self, i.e., processor 302 of processing node 202.

Request routing information 402 defines the path to which a request packet is forwarded and is used with directed requests. A one in a given bit position indicates that the request is routed through the corresponding path. The least significant bit of request routing information 402, bit[0], when set to one, indicates that the request is to be sent to self, i.e., the processor of this processing node. Bit[1], when set to one, routes traffic to HT link 0. Bit[2], when set, routes traffic to HT link 1. Bit[3], when set, routes traffic to HT link 2. Request packets are typically routed to only one destination. The destination node identifier in the request packet identifies which node register in the node table to use.

Figure 4B:
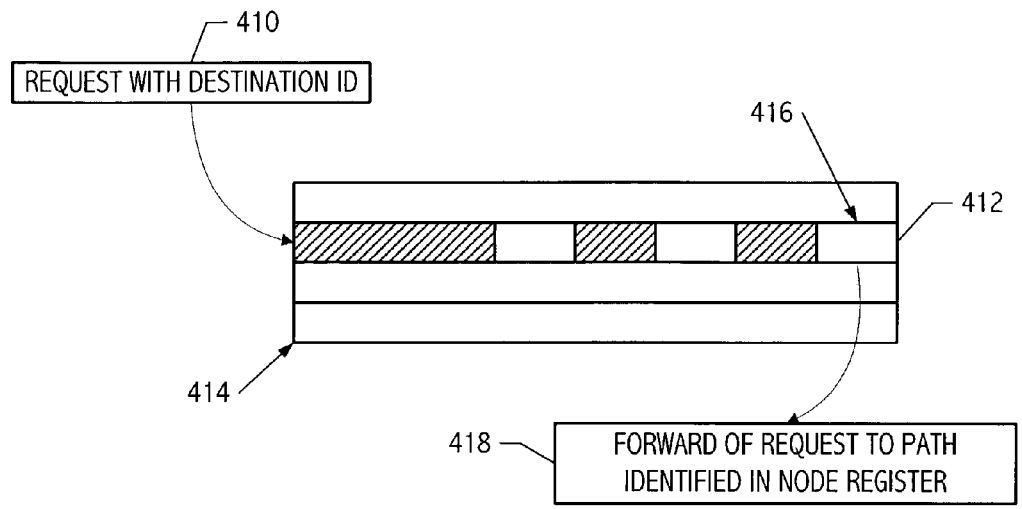

FIG. 4B illustrates the processing performed when a request 410 is received. Crossbar circuitry in the processing node receives request 410. Utilizing the destination node identifier in request 410, the appropriate node register 412 in node table 414 is identified. Utilizing request routing information 416, the appropriate path on which to forward request 418 is identified, one of several HT links or to self.

Response routing information 404 defines the node or link to which a response packet is forwarded and is used with responses. A one in a given bit position indicates that the response is routed through the corresponding path. The least significant bit of response routing information 404, bit[0], when set to one, indicates that the response is to be sent to self, i.e., the processor of this processing node. Bit[1], when set, routes traffic to HT link 0. Bit[2], when set, routes traffic to HT link 1. Bit[3], when set, routes traffic to HT link 2. Response packets are typically routed to only one destination. The destination node identifier in the response packet identifies which node register in the node table to use.

Figure 4C:
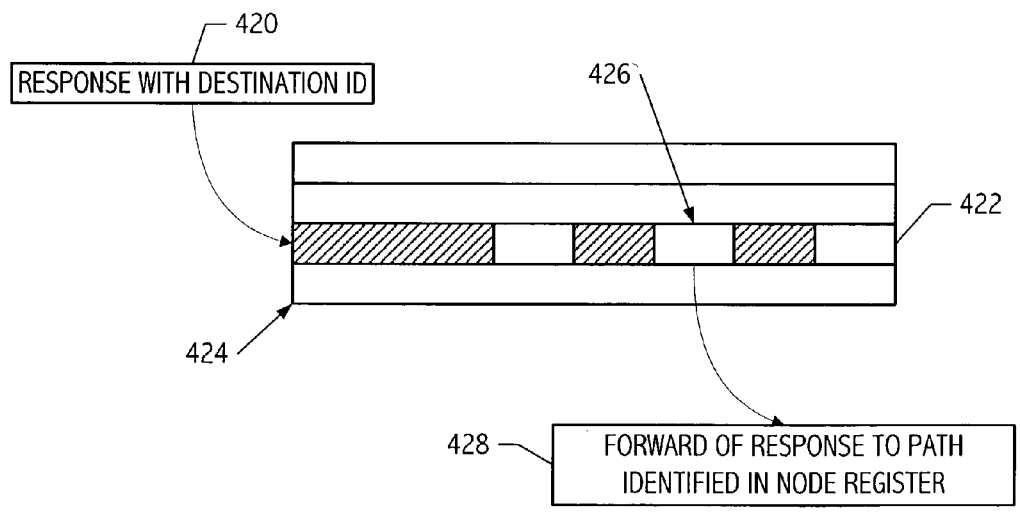

FIG. 4C illustrates the processing performed when a response 420 is received. Crossbar circuitry in the processing node receives response 420. Utilizing the destination node identifier in response 420, the appropriate node register 422 in node table 424 is identified. Utilizing response routing information 426, the appropriate path on which to forward response 428 is identified, one of several HT links or to self.

Broadcast routing information 406 defines the path(s) to which a broadcast packet is forwarded and is used with broadcast and probe requests. A broadcast packet is forwarded on all paths with the corresponding bit set to a one. The least significant bit of broadcast routing information 406, bit[0], when set to one, indicates that the broadcast is to be sent to self, i.e., the processor of this processing node. Bit[1], when set, routes traffic to HT link 0. Bit[2], when set, routes traffic to HT link 1. Bit[3], when set, routes traffic to HT link 2. Broadcasts can be routed to more than one destination. The source node identifier in the broadcast packet identifies which node register in the node table to use.

Figure 4D:
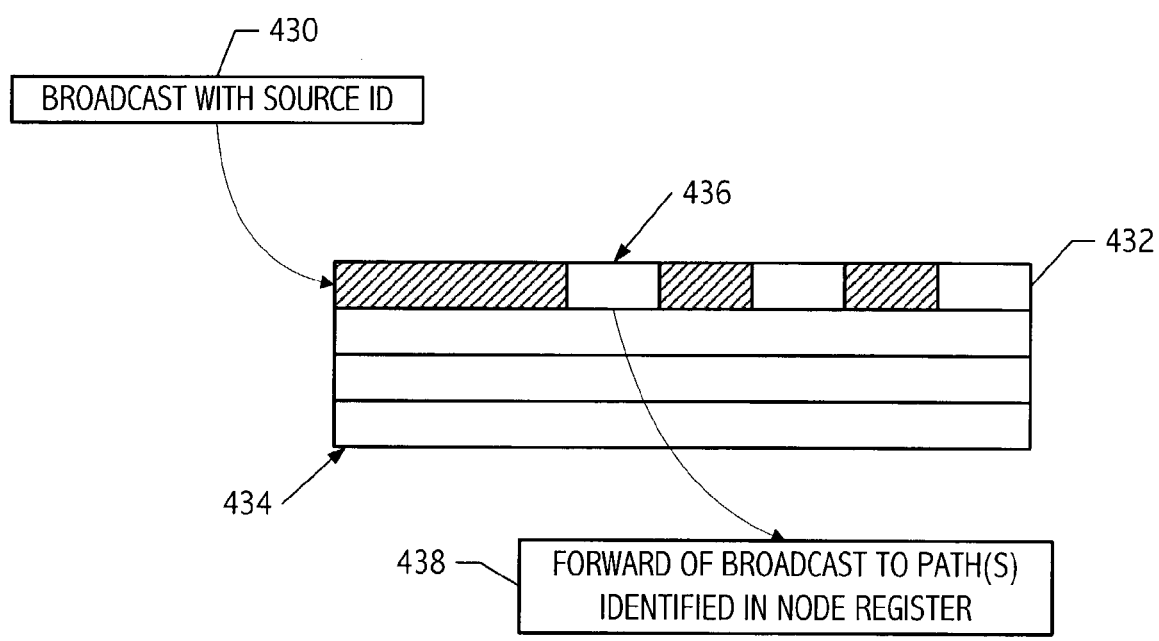

FIG. 4D illustrates the processing performed when a broadcast 430 is received. Crossbar circuitry in the processing node receives broadcast 430. Utilizing the source node identifier in broadcast 430, the appropriate node register 432 in node table 434 is identified. Utilizing broadcast routing information 436, one or more appropriate path(s) on which to forward broadcast 438 is identified, one or more of the HT links and to self.

Note that as illustrated, node register 400 supports four possible paths, three HT links and a path to self. Any number of links can be supported, for example, by using the reserved bits or expanding to another register. Any unused bits are preferably written to zero.

Also note that a particular node register in a node table is identified utilizing destination identifiers of requests and responses, but source identifiers of broadcasts. For example, a computing system with eight processing nodes [0:7] would have eight node registers[0:7]. Node register [0] of a forwarding processing node is consulted to determine which path to forward a request or response to such that the request or response reaches processing node [0]. However, node register [0] of a forwarding processing node is also consulted to determine which path(s) to forward a broadcast to when the broadcast is from processing node [0].

Figure 5A:
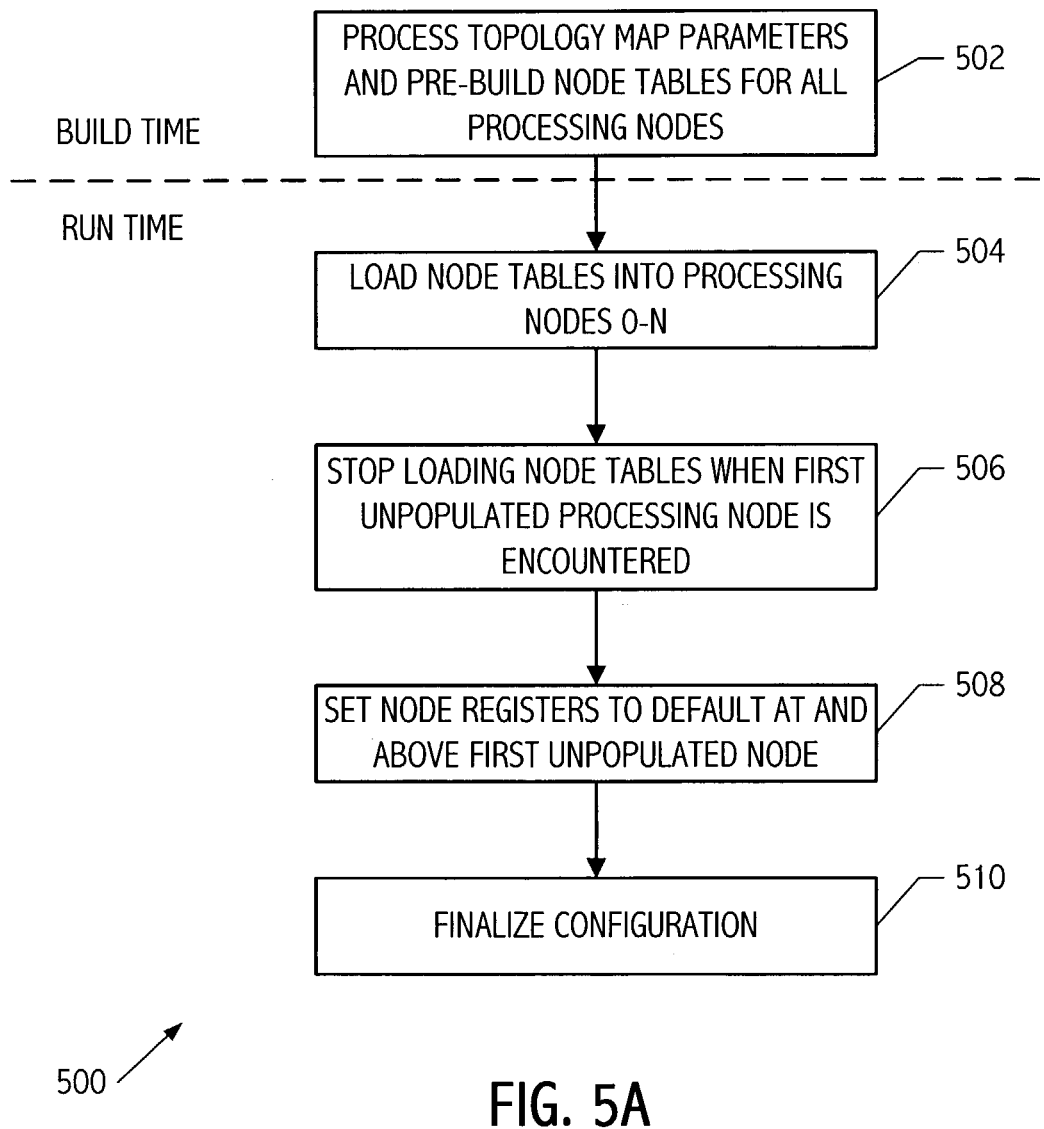
FIGS. 5A-5B illustrate exemplary flow diagrams of computing system fabric and routing configuration according to embodiments of the present invention.
Figure 5B:
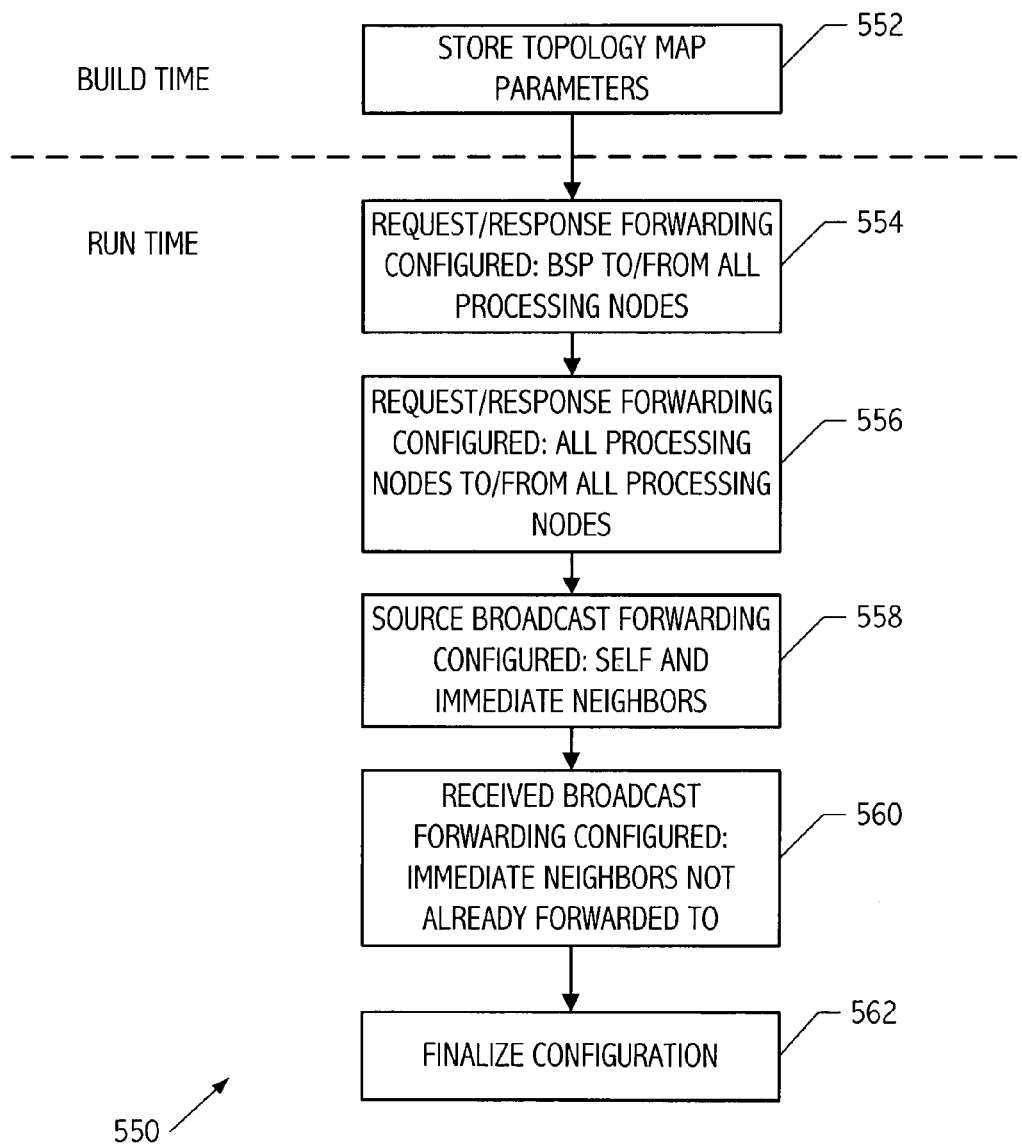

FIGS. 5A-5B illustrate exemplary flow diagrams of computing system fabric and routing configuration according to embodiments of the present invention. FIG. 5A illustrates an implementation where the majority of computing system fabric and routing configuration is determined at BIOS build time. FIG. 5B illustrates another implementation where the computing system fabric and routing configuration is determined at BIOS run time.

Referring to FIG. 5A, during BIOS build time, topology map parameters are processed, step 502. Topology map parameters describe the system fabric, i.e., the physical links between processing nodes. For example, a parameter can describe that HT link 0 of processing node 202[0] is physically connected to HT link 0 of processing node 202[1], HT link 1 of processing node 202[0] is physically connected to HT link 2 of processing node 202[2], and so on. Note that the topology map parameters only define the physical links of the platform. Even though a physical link exists to a processing node, that node may or may not be populated with a device. Additionally, the topology map parameters describe the non-coherent connections of the system, for example, that HT link 2 of processing node 202[0] is physically connected to video device 208. An exemplary format for topology map parameters is illustrated in FIG. 6.

The topology map parameters themselves are platform dependent and supplied to the BIOS, for example, by the system manufacturer. The processing of the topology map parameters is platform independent and fabric topology independent. Thus, when modifying a platform, the system manufacturer need only update the parameters. Thus, there is no need to modify the BIOS to support multiple platforms and system implementations. Additionally, when upgrading a system by, for example, populating a previously unpopulated node, there is no need to modify the BIOS.

Referring to step 502 of FIG. 5A, the processing of the topology map parameters also includes pre-building node tables for all processing nodes. These node tables are stored in BIOS for use during BIOS run time. The system configuration information gathered from the topology map parameters is used to define node tables for each processing node that is loaded during BIOS run time thus initializing the computing system fabric. In building the node tables, paths to be taken for requests, responses and broadcasts are determined when, for example, processing node 202[0] wants to communicate with processing node 202[1]. Routing paths are determined by optimizing for distance, for example, the fewest number of hops or according to a balanced traffic pattern. Additionally, routing paths are determined assuming full population or in the alternative, sequential population of the processing nodes. Thus, the node tables are built for all possible nodes and re-routing is not necessary when less than all possible nodes are populated. The node tables themselves can be stored in BIOS for automatic loading at run time, or an alternative format can be used, for example, to minimize storage space required or to minimize processing time required during loading.

During run time, the node tables pre-built in step 502 are loaded into processing nodes beginning with processing node 0, designated as the boot strap processor, step 504. The loading of node registers is stopped when the first unpopulated processing node is encountered, step 506. Because the node tables were fully defined assuming full population of all processing nodes in step 502, the node registers in the node tables already loaded for populated processing nodes are set to default condition for all references to unpopulated processing nodes. For example, in a four processing node system when only two processing nodes are populated, the third and fourth node registers of the populated nodes are set to a default value, for example, route only to self, because no request or response packets should be sent to and no broadcast packets should be received from unpopulated nodes. In addition, any bits routing a packet on a link to an unpopulated node is cleared. After clearing node registers as needed, finalization of the configuration is completed, step 510. This includes, for example, recording the number of processing nodes populated and the system link characteristics, activating the routing tables, and the like.

According to the embodiment illustrated in FIG. 5A, population of processing nodes must occur in a specified manner. Note that at least the boot strap processor needs to be populated, while all other processing nodes may be populated or unpopulated, albeit in order. For example, if only processing nodes [0] and [2] are populated, only processing node [0] will be configured. Thus, the processing can be optimized such that re-routing does not need to occur once population is determined and ordering of processing nodes is taken into account when defining node tables in step 502.

FIG. 5B illustrates another implementation of system fabric and routing configuration according to an embodiment of the present invention. In this embodiment, the computing system fabric and routing configuration is determined at BIOS run time. During build time, topology map parameters are stored in BIOS for use during BIOS run time, step 552.

During run time, the node registers of the node tables of each populated processor are configured. First, the routing of requests and responses to and from the boot strap processor (processing node[0]) to all other populated processing nodes is determined and the appropriate locations in the node registers of each processing node are configured, step 554. BIOS determines first if a node is populated. If so, the routing of requests and responses to and from the boot strap processor is determined and configured. If not, processing skips to the next node to determine the node's population. Determination of population can be accomplished by sequentially investigating each link of the boot strap processor, then each link of the first processing node found, and so on walking links and processing nodes in order. Note that in flow 550, after the boot strap processor is populated, nodes can be populated in any order. As long as there is an adjacent processor, all found processing nodes can be configured. Note, for example, in computing system 200, that if only processing nodes[0] and [3] are populated, processing node[3] will not be configured since there is no adjacent processing node to provide a communication path between processing nodes [0] and [3]. As unpopulated nodes are encountered, processing nodes are renumbered as needed such that processing node numbering is sequential. For example, if only processing nodes [0] and [2] are populated, processing node [2] is renumbered to be processing node [1]. After step 554 is complete, a request or response can be sent from processing node[0] to any of the other processing nodes and a request or response can be sent from any of the other processing nodes to processing node[0].

Next, the routing of requests and responses between all processing nodes is determined and the appropriate locations in the node registers of each processing node are configured, step 556. After step 556 is complete, a request or response can be sent from any processing node to any of the other processing nodes.

Next, the routing of source broadcasts for each processing node is determined and the appropriate locations in the node registers are configured, step 558. In particular, a processing node that is the source of a broadcast message forwards that message to itself and to all immediate neighboring processing nodes. In computing system 200, step 558 configures broadcasts to be forwarded from processing node[0] to itself, processing node [1], and processing node[2]; from processing node [1] to itself, processing node[0], and processing node [3]; from processing node [2] to itself, processing node[0], and processing node[3]; and from processing node[3] to itself, processing node[l], and processing node[2].

The broadcast message may not reach all processing nodes depending on system configuration. Thus, each processing node is configured to forward a received broadcast message to immediate neighbors that have not already been configured to receive the broadcast message, step 560. Forwarding of received broadcast messages is repeated until all processing nodes have received the broadcast. For computing system 200, only one iteration is needed because no two processing nodes are more than two links apart. In computing system 200, step 560 forwards a received broadcast sourced from processing node[0] that has already been forwarded to itself, processing node[1], and processing node[2], from processing node[1] to processing node[3]; forwards a received broadcast sourced from processing node[1] that has already been forwarded to itself, processing node[0], and processing node[3], from processing node[0] to processing node[2]; forwards a received broadcast sourced from processing node[2] that has already been forwarded to itself, processing node[0], and processing node[3], from processing node[0] to processing node[l]; and forwards a received broadcast sourced from processing node[3] that has already been forwarded to itself, processing node[1], and processing node[2], from processing node[1] to processing node[0]. Note that, for example, the received broadcast sourced from processing node[0] is only forwarded from processing node[1] to processing node[3] and not additionally from processing node[2] to processing node[3]. Thus, a broadcast message sourced from any processing node reaches all other processing nodes, but no duplicate broadcast messages are received by any nodes.

Finalization of the configuration is completed, step 562. This includes, for example, recording the number of processing nodes populated and the system link characteristics, activating the routing tables, and the like.

In one embodiment of the present invention, response and request routing bits of node routing tables for each processing node are determined and programmed first, then broadcast routing bits for each processing node. Alternatively, BIOS can fully configure each processing node one at a time.

According to the embodiment illustrated in FIG. 5B, processing nodes can be populated in a variety of ways, allowing for many different system implementations.

In flows 500 and 550, the shortest path between processing nodes can be chosen for traffic routing. Alternatively, alternate traffic patterns can be utilized to distribute traffic and reduce traffic bottlenecks.

Flows 500 and 550 are utilized for system fabric and routing configuration according to some embodiments of the invention. It is appreciated that operations discussed herein can include directly entered commands by a computer system user, but the preferred embodiment includes steps executed by software modules. The functionality of step referred to herein may correspond to the functionality of modules or portions of modules. In addition to software modules, the above flows or portions of flows can be implemented as application instructions or menu items.

The operations referred to herein may be modules or portions of modules (e.g., software, firmware, or hardware modules). For example, the software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiments are for illustration only. Operations may be combined or the functionality of the operations may be distributed in additional operations in accordance with the invention.

Thus, the flows described herein, the operations thereof and modules therefore may be executed on a computer system configured to execute the operations of the flows and/or may be executed from computer-readable media. The flows may be embodied in a machine-readable and/or computer-readable medium for configuring a computer system to execute the flows. Thus, the software modules may be stored within and/or transmitted to a computer system memory to configure the computer system to perform the functions of the module.

Both flows can utilize a standardized topology map parameter format that allows simple definition of a system's configuration. Topology map parameters are supplied, for example, by a system board supplier, and are utilized by software routines in BIOS to appropriately configure system fabric and routing. An exemplary topology map parameter format for a system is illustrated in FIG. 6. As shown, first the coherent portion of the system is described (start_cHT_fabric_map) by listing the processing nodes and listing the port connections for each node. Note that a processing node may or may not be populated. Population is determined at run time, therefore, a single platform board can be used with multiple processing node populations without requiring different BIOS implementations. Multiple non-coherent chains of devices can be described (start_ncHT_CHAIN) by listing the processing node the chain originates from, bus characteristics, and devices. By using this format, any system configuration can be defined, simply and concisely, and multiple implementations can be supported without changing the BIOS implementation. By having a single implementation of BIOS, design cycle times can be shorted, and efficiency and reliability of the computing system improved.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of configuring a computing system comprising:
processing topology map parameters that describe physical connections of the computing system, wherein the computing system includes a plurality of processing nodes;
determining routing paths for traffic between the plurality of processing nodes;
in the computing system, determining a population of the plurality of processing nodes using communication links coupling processing nodes of the computing system, wherein determining the population includes determining whether individual nodes of the plurality of processing nodes are populated with a corresponding device; and
loading the routing paths according to the population into a node table of at least one populated processing node,
wherein the determining the population of the plurality of processing nodes comprises sequentially checking for population and stopping the checking upon finding a first unpopulated processing node.

2. The method as recited in claim 1, wherein the determining the routing paths is performed during BIOS build time.

3. The method as recited in claim 1, wherein the determining the population occurs after the determining the routing paths.

4. The method as recited in claim 3, further comprising loading the routing paths into a node table in each of the plurality of processing nodes.

5. The method as recited in claim 1, wherein the loading is terminated upon encountering a first unpopulated processing node.

6. The method as recited in claim 4, further comprising after the determining the population, modifying the node table in each of the plurality of processing nodes wherever the node table references an unpopulated node.

7. The method as recited in claim 1, wherein the determining the routing paths is performed during BIOS run time.

8. The method as recited in claim 1, wherein the determining the population occurs prior to determining the routing paths.

9. A method of configuring a computing system comprising:
processing topology map parameters that describe physical connections of the computing system, wherein the computing system includes a plurality of processing nodes;
determining routing paths for traffic between the plurality of processing nodes;
in the computing system, determining a population of the plurality of processing nodes using communication links coupling processing nodes of the computing system, wherein determining the population includes determining whether individual nodes of the plurality of processing nodes are populated with a corresponding device;
loading the routing paths according to the population into a node table of at least one populated processing node,
wherein the determining the population occurs prior to determining the routing paths;
renumbering the plurality of processing nodes when one of the plurality of processing nodes is unpopulated.

10. The method as recited in claim 8, wherein the routing paths are loaded into the node table of each processing node as the routing paths are determined.

11. The method as recited in claim 1, wherein the determining the routing paths comprises determining the routing of request, response, and broadcast packets between the plurality of processing nodes and the method further comprises separately storing routing information respectively corresponding to request, response, and broadcast packets in respective node tables in each of the processing nodes.

12. The method as recited in claim 11, wherein broadcast packets are received only once by each of the plurality of processing nodes.

13. The method as recited in claim 1, wherein the determining the routing paths comprises performing a distance algorithm to find a shortest routing path.

14. The method as recited in claim 1, wherein the determining the population of the plurality of processing nodes comprises determining the population of every processing node.

15. The method as recited in claim 9, wherein the determining the population of the plurality of processing nodes comprises sequentially checking for population and stopping the checking upon finding a first unpopulated processing node.

16. A computer program product for configuring a system comprising:
a set of software instructions stored on computer readable storage media, the set of software instructions configured to:
process topology map parameters that describe physical connections of a computing system, wherein the computing system includes a plurality of processing nodes;
determine routing paths for traffic between the plurality of processing nodes; and
determine whether individual nodes of the plurality of processing nodes are populated with a corresponding device to thereby determine a population of the plurality of processing nodes,
wherein the set of software instructions to determine the population of the plurality of processing nodes is configured to sequentially check for population and stop the checking upon finding a first unpopulated processing node.

17. The computer program product as recited in claim 16, wherein the set of software instructions is configured to determine the routing paths during BIOS build time.

18. The computer program product as recited in claim 16, wherein the set of software instructions is configured to determine the population after determining the routing paths.

19. The computer program product as recited in claim 18, wherein the set of software instructions is further configured to load the routing paths into a node table in each of the plurality of processing nodes.

20. The computer program product as recited in claim 19, wherein the set of software instructions is configured to terminate the loading upon encountering a first unpopulated processing node.

21. The computer program product as recited in claim 19, wherein the set of software instructions is further configured to modify the node table in each of the plurality of processing nodes wherever the node table references an unpopulated node after determining the population.

22. The computer program product as recited in claim 16, wherein the set of software instructions is configured to determine the routing paths during BIOS run time.

23. The computer program product as recited in claim 16, wherein the set of software instructions is configured to determine the population prior to determining the routing paths.

24. The computer program product as recited in claim 23, wherein the set of software instructions is further configured to renumber the plurality of processing nodes when one of the plurality of processing nodes is unpopulated.

25. The computer program product as recited in claim 23, wherein the set of software instructions to determine the routing paths is configured to load the routing paths into a node table of each processing node as the routing paths are determined.

26. The computer program product as recited in claim 16, wherein the set of software instructions to determine the routing paths is configured to determine the routing of request, response, and broadcast packets between the plurality of processing nodes and to separately store routing information respectively corresponding to request, response, and broadcast packets in respective node tables in each of the processing nodes.

27. The computer program product as recited in claim 26, wherein the set of software instructions to determine the routing paths is configured to send broadcast packets only once to each of the plurality of processing nodes.

28. The computer program product as recited in claim 16, wherein the set of software instructions to determine the routing paths is configured to perform a distance algorithm to find a shortest routing path.

29. The computer program product as recited in claim 16, wherein the set of software instructions to determine the population of the plurality of processing nodes is configured to determine the population of every processing node.

30. The method as recited in claim 5, further comprising after stopping loading the routing paths, setting to default values node registers for nodes at and above the first unpopulated processing node.

31. The method as recited in claim 1 further comprising, as unpopulated nodes are encountered, renumbering processing nodes so that processing node numbering remains sequential.

32. An apparatus comprising:
a computing system including a plurality of processing nodes,
wherein the computing system is configured to process topology map parameters that describe physical connections of the computing system, determine routing paths for traffic between the plurality of processing nodes, and determine whether individual nodes of the plurality of processing nodes are populated with a corresponding device,
wherein each of the plurality of processing nodes comprises:
a processor;
crossbar circuitry;
a memory controller;
a plurality of link interfaces; and
a node table including one node register for each possible processing node of the computing system,
wherein the computing system is configured to sequentially check for population and stop the checking upon finding a first unpopulated processing node.

33. The apparatus as recited in claim 32, wherein the computing system is configured to determine the routing paths during BIOS build time.

34. The apparatus as recited in claim 32, wherein the computing system is configured to determine the population after determining the routing paths.

35. The apparatus as recited in claim 34, wherein the computing system is configured to load the routing paths into the node table of each of the plurality of processing nodes.

36. The apparatus as recited in claim 35, wherein the computing system is configured to terminate the loading upon encountering a first unpopulated processing node.

37. The apparatus as recited in claim 35, wherein the computing system is configured to modify the node table in each of the plurality of processing nodes wherever the node table references an unpopulated node.

38. The apparatus as recited in claim 32, wherein the computing system is configured to determine the routing paths during BIOS run time.

39. The apparatus as recited in claim 32, wherein the computing system is configured to determine the population prior to determining the routing paths.

40. The apparatus as recited in claim 39, wherein the computing system is configured to renumber the plurality of processing nodes when one of the plurality of processing nodes is unpopulated.

41. The apparatus as recited in claim 40, wherein the computing system is configured to load the routing paths into the node table of each processing node as the routing paths are determined.

42. The apparatus as recited in claim 32, wherein the computing system is configured to determine the routing of request, response, and broadcast packets between the plurality of processing nodes and separately store routing information respectively corresponding to request, response, and broadcast packets in respective node tables in each of the processing nodes.

43. The apparatus as recited in claim 42, wherein broadcast packets are received only once by each of the plurality of processing nodes.

44. The apparatus as recited in claim 32, wherein the computing system is configured to perform a distance algorithm to find a shortest routing path.

45. The apparatus as recited in claim 32, wherein the computing system is configured to determine the population of every processing node.

* * * * *